BEST AVAILABLE COPY

United States Patent [19]

Bellavance

[11] E Patent Number: Re. 32,656

[45] Reissued Date of Patent: Apr. 26, 1988

[54] WRITING INSTRUMENT WITH FASTENING MEANS

[76] Inventor: Roger T. Bellavance, P.O. Box 866, Moosup, Conn.

[21] Appl. No.: 84,554

[22] Filed: Aug. 12, 1987

[51] Int. Cl.[4] ..... B43K 24/00; B43K 7/12; B43K 29/00; B43K 25/00

[52] U.S. Cl. ..... 401/104; 24/11 R; 24/11 M; 70/459; 401/99; 401/109; 401/195; 401/52

[58] Field of Search ..... 401/99, 195, 104, 105, 401/106, 52, 109; 70/456 R, 459; 24/3 K, 10 R, 11 R, 11 M

[56] References Cited

U.S. PATENT DOCUMENTS

| | | | |
|---|---|---|---|
| 387,042 | 7/1888 | Bohren | 401/110 X |
| 803,839 | 11/1905 | Merrill | 70/459 |
| 1,795,555 | 3/1931 | Greenwood | 70/459 |
| 2,400,679 | 5/1946 | Biro | 401/106 |
| 2,715,888 | 8/1955 | Liguori | 401/105 |
| 2,928,373 | 3/1960 | Esterow | 401/105 |
| 3,120,837 | 2/1964 | Johnson | 401/111 |
| 3,288,115 | 11/1966 | Hechtle | 401/110 |
| 3,344,484 | 10/1967 | Zepell et al. | 24/11 P |

FOREIGN PATENT DOCUMENTS

| | | | |
|---|---|---|---|
| 1007666 | 5/1957 | Fed. Rep. of Germany | 401/105 |
| 3300038 | 7/1984 | Fed. Rep. of Germany | 401/195 |
| 72880 | 4/1960 | France | 401/104 |
| 245096 | 6/1947 | Switzerland | 24/11 M |
| 273976 | 3/1951 | Switzerland | 401/105 |

*Primary Examiner*—Steven A. Bratlie
*Attorney, Agent, or Firm*—Fishman & Dionne

[57] ABSTRACT

A writing instrument, having a mechanism for alternately retracting and protracting its writing point, comprises a shackle alternately closed and opened by that mechanism, for releasably fastening to an associated object.

26 Claims, 1 Drawing Sheet

BEST AVAILABLE COPY
BEST AVAILABLE COPY

BEST AVAILABLE COPY

WRITING INSTRUMENT WITH FASTENING MEANS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates generally to writing instruments, and more particularly to writing instruments in which the writing point may be axially displaced to alternately protracted and retracted positions by successive axially inward displacements of the end, of the writing instrument, remote from the writing point.

Such writing instruments have been highly developed over a considerable period: an early example is disclosed in U.S. Pat. No. 387,042, July 31, 1888, to Ulrich Bohren; more recent improvements are disclosed in U.S. Pat. No. 3,120,837, Feb. 11, 1964, to William F. Johnson and in U.S. Pat. No. 3,288,115, Nov. 29, 1966, to Emil Hechtle. These instruments, particularly those utilizing a ball-type writing point, are extensively preferred. One reason for this preference is that they do not require a separate point cover or cap which can be mislaid or lost.

2. Prior Art Problem

However, the entire instrument may inadvertently be separated from a desk, clipboard or notebook with which it is intended to be used. To obviate this difficulty, such writing instruments are frequently provided with some sort of leash, frequently of light chain, by which they can be tied to associated objects with which they are to be used. Such leashes, unfortunately, tend to impede the task of writing.

It would therefore be useful to devise a writing instrument which fastens reliably to an associated object when it is not being employed for writing, and which is not encumbered when it is so employed. It is the principal object of this invention to provide such an instrument. It is a further object of this invention to provide an instrument of the simplest character.

SUMMARY OF THE INVENTION

According to this invention, the stated objects are achieved by utilizing the axial displacements of the writing point, to alternately protracted and retracted positions, to produce corresponding displacements of a pawl to alternately open and close a side of a shackle which can receive a fastening member, such as a ring, which is borne by an associated object. Thereby, pressing the end of the instrument to protract its writing point to the exposed position automatically displaces the pawl to open the side of the shackle, freeing the instrument from the associated object. Also, pressing the end of the instrument again to retract the writing point to the covered position automatically displaces the pawl to close the side of the shackle, thereby allowing the shackle to engage a received fastening member to fasten the instrument to an associated object.

These and further objects of this invention, as well as the means for attaining them, are set forth in the following Specification and Drawings, wherein:

DESCRIPTION OF THE INVENTION

Figure 1:
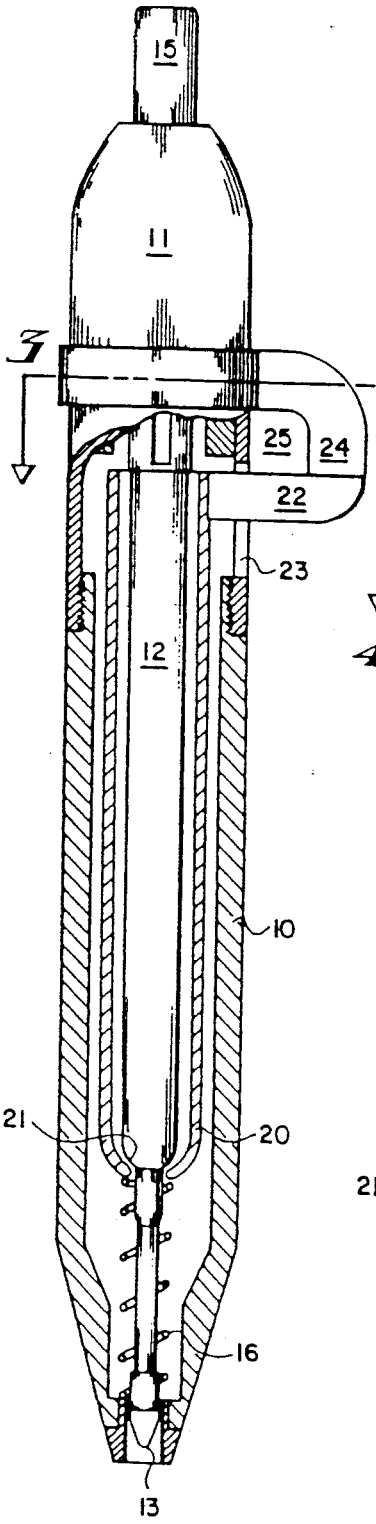
FIG. 1 is a schematic view, mostly in lengthwise cross-section, of a writing instrument according to this invention, with the writing point in the retracted position.
Figure 2:
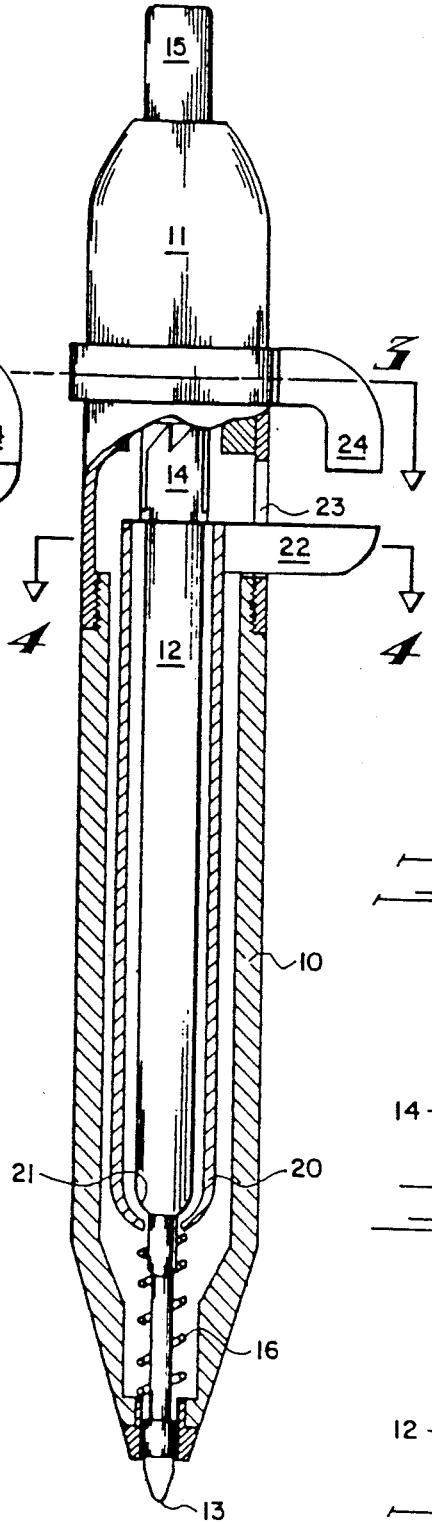
FIG. 2 is a similar view of the same instrument, with the writing point in the protracted position.

Reference is made to FIGS. 1 and 2, which illustrate a preferred embodiment of this invention. The writing instrument has a conventional outer case comprising a barrel 10 and a cap 11 fastened thereto by a threaded joint. It also has a conventional cartridge 12 of the so-called "Parker" type provided at one end with a ball-point writing element 13 and at the other end with a rotary ratchet cam 14. That cam is engaged and operated by the usual mechanism (not shown) so that as pushbutton 15 is repetitively pressed, cartridge 12 and its writing element or point 13 are successively retracted and protracted as illustrated in, respectively, FIG. 1 and FIG. 2, with retraction force being provided by compression spring 16.

Figure 4:
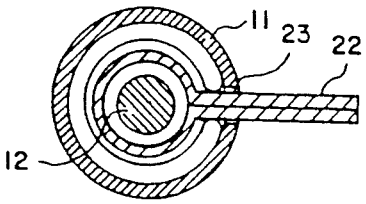
FIG. 4 is a cross-section of the instrument through the pawl of the shackle.

The preferred embodiment further comprises a bushing 20 which surrounds and rotates easily upon cartridge 12. Bushing 20 is reduced in diameter at one end to engage diameter step 21 of cartridge 12, against which step it is urged by compression spring 16. The other end of bushing 20 is provided with a pawl 22 which passes out through a slot 23 in cap 11. As shown in FIG. 4, bushing 20 may be constructed as a butted tube integrally connected to two tabs bent outwardly to form pawl 22; these tabs may be joined by adhesive bonding or electric spot welding. It should be clear that the thickness of bushing 20 and the magnitude of its clearance have been exaggerated in the Figures in the interest of clarity.

Figure 3:
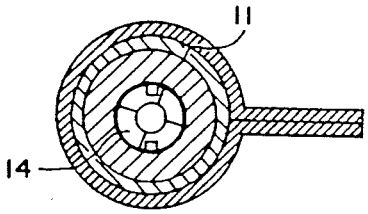
FIG. 3 is a cross-section of the instrument through the fixed part of the shackle.

The preferred embodiment also comprises a shackle arm 24 which, together with pawl 22, defines a shackle having an opening 25; this shackle is shown closed in FIG. 1, in which writing point 13 is shown retracted, and is shown open in FIG. 2, in which the point is shown protracted. As shown in FIG. 3, shackle arm 24 may also be configured as a butted tube integrally connected to two outwardly-bent tabs, and may be joined to itself and to cap 11 by adhesive bonding or electric spot welding.

Opening 25 may receive a fastening member, such as a ring, which is borne by an associated object with which it is desired to employ the writing instrument. For example, it can readily fasten to a ring of a looseleaf ring binder, and thus be less likely to be mislaid, since a single motion retracts the writing point and also fastens the writing instrument to the ring.

Figure 5:
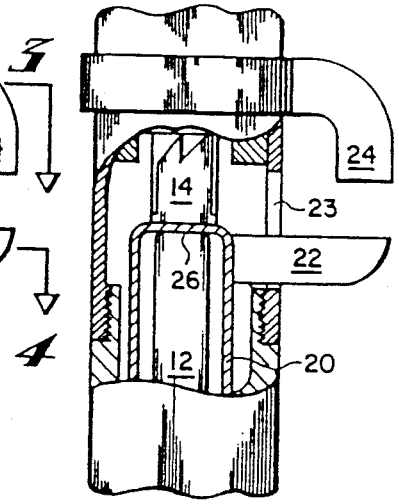
FIG. 5 is a fragmentary schematic view, mostly in lengthwise cross-section, of an alternative embodiment of this invention.

The illustrated preferred embodiment utilizes a cartridge of the so-called "Parker" type, which has rotary ratchet cam 14 mounted directly on the upper end. In another common form of mechanism, illustrated in FIG. 5, cam 14 is mounted together with the rest of the mechanism within cap 11; the cartridge, comprising just

BEST AVAILABLE COPY the ink chamber and the writing point, is positioned axially by abutment of chamber end 26 with rotary ratchet cam 14. In this embodiment, bushing 20 does not need to engage a diameter step 21 as shown in FIGS. 1 and 2, but may merely engage chamber end 26. Indeed, since it is then unnecessary that cartridge 12 be able to rotate, bushing 20 could then simply be fixed to cartridge 12 as by adhesive bonding; in such an example, bushing 20 and pawl 22 become part of the disposable cartridge.

Given the foregoing teaching, those skilled in the art to which this invention pertains may readily devise further embodiments. For one example, the illustrated form employing pushbutton 15 may be replaced by a form using an enveloping outer cap; also, one may use other well-known mechanisms for protracting and retracting the writing point. Moreover, the shape of shackle arm 24 and pawl 22 may be changed without loss of function; for example, pawl 22 could have an L-shaped external portion, and the mating portion of shackle arm 24 could be straight. Further, the shackle arm may be fixed to the outer case by being integral therewith, as by being a notch in the outer case or a protuberance molded thereon.

Yet other variations and modifications of the illustrated embodiments may be achieved without departing from the spirit and scope of the invention as defined by the following claims:

I claim:

1. A writing instrument having an outer case which contains an elongated cartridge having an axis, said cartridge bearing a writing point at one end and engaging, at the other end, a mechanism for alternately moving said cartridge axially to position said writing point to alternately a retracted position within said outer case and a protracted position protruding outside said outer case, said writing instrument further comprising:

a rigid shackle arm, fixed to said outer case;

a bushing, enveloping said cartridge within said outer case and adapted to be moved axially by said cartridge; and a pawl, borne by said bushing and movable substantially solely axially thereby, said pawl protruding through a slot in said outer case to define, with said shackle arm, a shackle which is open when said writing point is in a protracted position and which is closed when said writing point is in a retracted position.

2. A writing instrument according to claim 1 in which said bushing is easily rotatable upon said cartridge.

3. A writing instrument according to claim 1 in which said bushing is fixed to said cartridge.

4. A writing instrument according to claim 1 in which said bushing has a section of reduced diameter which engages a section of changing diameter of said cartridge.

5. A writing instrument according to claim 4 in which said section of reduced diameter is urged, to engage said section of changing diameter, by one end of a spring, the other end of which bears upon the inside of said outer case.

6. A writing instrument according to claim 1 in which said cartridge comprises a chamber end opposite said writing point, and said bushing engages said chamber end.

7. A writing instrument according to claim 6 in which said bushing is urged, to engage said chamber end, by one end of a spring, the other end of which bears upon the inside of said outer case.

8. A writing instrument according to claim 1 in which said shackle, when closed, defines an opening sufficiently large to engage a fastening member affixed to an associated object.

*9. A writing instrument having an outer case which contains an elongated cartridge having an axis, said cartridge bearing a writing point at one end and engaging, at the other end, a mechanism for alternately moving said cartridge axially to position said writing point to alternately a retracted position within said outer case and a protracted position protruding outside said outer case, said writing instrument further comprising:*

*a rigid shackle arm, fixed to said outer case;*

*a bushing, enveloping at least a portion of said cartridge within said outer case and adapted to be moved axially with said cartridge; and*

*a pawl, borne by said bushing and movable substantially solely axially thereby, said pawl protruding through an opening in said outer case to define, with said shackle arm, a shackle which is open when said writing point is in a protracted position and which is closed when said writing point is in a retracted position.*

*10. A writing instrument according to claim 9 in which said bushing is easily rotatable upon said cartridge.*

*11. A writing instrument according to claim 9 in which said bushing is fixed to said cartridge.*

*12. A writing instrument according to claim 9 in which said bushing has a section of reduced diameter which engages a section of changing diameter of said cartridge.*

*13. A writing instrument according to claim 12 in which said section of reduced diameter is urged, to engage said section of changing diameter, by one end of a spring, the other end of which bears upon the inside of said outer case.*

*14. A writing instrument according to claim 9 in which said cartridge comprises a chamber end opposite said writing point, and said bushing engages said chamber end.*

*15. A writing instrument according to claim 14 in which said bushing is urged, to engage said chamber end, by one end of a spring, the other end of which bears upon the inside of said outer case.*

*16. A writing instrument according to claim 9 in which said shackle, when closed, defines an opening sufficiently large to engage a fastening member affixed to an associated object.*

*17. A writing instrument having an outer case which contains an elongated cartridge having an axis, said cartridge bearing a writing point at one end and engaging, at the other end, a mechanism for alternately moving said cartridge axially to position said writing point to alternately a retracted position within said outer case and a protracted position protruding outside said outer case, said writing instrument further comprising:*

*a rigid shackle arm fixed to said case;*

*a pawl operatively connected to said cartridge and movable substantially solely axially with said cartridge, said pawl protruding through an opening in said outer case to define, with said shackle arm, a shackle which is open when said writing point is in a protracted position and which is closed when said writing point is in a retracted position.*

*18. A writing instrument according to claim 17 wherein: said pawl is operatively connected to said cartridge via bushing means.*

*19. A writing instrument according to claim 18 wherein: said bushing means is supported by said cartridge within said outer case and is adapted to be moved axially with said cartridge.*

BEST AVAILABLE COPY

*20. A writing instrument according to claim 18 in which said bushing means is easily rotatable upon said cartridge.*

*21. A writing instrument according to claim 18 in which said bushing means is fixed to said cartridge.*

*22. A writing instrument according to claim 18 in which said bushing means has a section of reduced diameter which engages a section of changing diameter of said cartridge.*

*23. A writing instrument according to claim 22 in which said section of reduced diameter is urged, to engage said section of changing diameter, by one end of a spring, the other end of which bears upon the inside of said outer case.*

*24. A writing instrument according to claim 18 in which said cartridge comprises a chamber end opposite said writing point, and said bushing means engages said chamber end.*

*25. A writing instrument according to claim 24 in which said bushing means is urged, to engage said chamber end, by one end of a spring, the other end of which bears upon the inside of said outer case.*

*26. A writing instrument according to claim 17 in which said shackle, when closed, defines an opening sufficiently large to engage a fastening member affixed to an associated object.*

* * * * *